US008677283B2

(12) United States Patent
Fong

(10) Patent No.: US 8,677,283 B2
(45) Date of Patent: Mar. 18, 2014

(54) DISPLAYING LISTS AS REACTING AGAINST BARRIERS

(75) Inventor: Jeffrey C. Fong, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 632 days.

(21) Appl. No.: 12/603,251

(22) Filed: Oct. 21, 2009

(65) Prior Publication Data

US 2011/0093812 A1    Apr. 21, 2011

(51) Int. Cl.
*G06F 3/033* (2013.01)

(52) U.S. Cl.
USPC .......... 715/863; 715/810; 715/716; 715/830; 715/829; 345/173

(58) Field of Classification Search
USPC ......... 715/784–789, 810, 863, 716, 829, 830; 345/173
See application file for complete search history.

(56) References Cited

U.S. PATENT DOCUMENTS

| 6,690,365 | B2 | 2/2004 | Hinckley et al. | |
|---|---|---|---|---|
| 7,469,381 | B2 | 12/2008 | Ording | |
| 7,515,142 | B2* | 4/2009 | Park | 345/173 |
| 2008/0168404 | A1* | 7/2008 | Ording | 715/863 |
| 2008/0189657 | A1* | 8/2008 | Kim | 715/810 |
| 2009/0070707 | A1 | 3/2009 | Schaller et al. | |
| 2009/0070711 | A1* | 3/2009 | Kwak et al. | 715/829 |
| 2009/0074265 | A1 | 3/2009 | Huang et al. | |
| 2009/0163250 | A1* | 6/2009 | Park | 455/566 |
| 2009/0231271 | A1* | 9/2009 | Heubel et al. | 345/156 |
| 2010/0058240 | A1* | 3/2010 | Bull et al. | 715/830 |
| 2010/0131886 | A1* | 5/2010 | Gannon et al. | 715/786 |
| 2010/0146412 | A1* | 6/2010 | Nagase | 715/760 |
| 2010/0175027 | A1* | 7/2010 | Young et al. | 715/830 |
| 2011/0066984 | A1* | 3/2011 | Li | 715/863 |
| 2011/0265003 | A1* | 10/2011 | Schubert et al. | 715/716 |
| 2012/0011462 | A1* | 1/2012 | Westerman et al. | 715/773 |
| 2012/0023461 | A1* | 1/2012 | Blumenberg | 715/863 |
| 2012/0023509 | A1* | 1/2012 | Blumenberg | 719/329 |

OTHER PUBLICATIONS

Chang et al.; QPalm: A Gesture Recognition System for Remote Control with List Menu; © 2008; IEEE; p. 20-26.*
Froehlich et al.; Barrier Pointing: Using Physical Edges to Assist Target Acquisition on Mobile Device Touch Screens; © 2007; ACM; 8 pages.*
"Using the Touchpad (ebooks, Scrollling, etc", retrieved at <<http://www.meizume.com/general-meizu-m6/32-using-touchpad-ebooks-scrollling-etc.html>>, Nov. 16, 2006, pp. 4.

(Continued)

*Primary Examiner* — Linh K Pham
(74) *Attorney, Agent, or Firm* — Micah Goldsmith; Glen Johnson; Micky Minhas

(57) ABSTRACT

A first set of entries in a list having multiple entries is displayed. Different ones of the multiple entries are displayed as the list is scrolled through in response to a first user gesture. Additionally, in response to the first user gesture when a second set of entries at an end of the list is being displayed, the second set of entries is displayed in a manner in which the second set of entries appear to react against (e.g., bounce or compress) against a barrier at the end of the list. Furthermore, in response to a second user gesture when the second set of entries is being displayed, the first set of entries at the beginning of the list is displayed.

20 Claims, 10 Drawing Sheets

(56) References Cited

OTHER PUBLICATIONS

"Wrap-Around Scrolling Issue", retrieved at <<http://www.anythingbutipod.com/forum/showthread.php?t=35693>>, Aug. 11, 2009, pp. 3.

"Smooth Scrolling Links in Wordpress [SSL]", retrieved at <<http://www.thechetan.com/smoothscrolllinks>>. Aug. 11, 2009, pp. 6.

"Detailed Information about Actions", retrieved at <<http://www.wblady.com/info-more-details1.html>>, Aug. 11, 2009, pp. 14.

* cited by examiner

DISPLAYING LISTS AS REACTING AGAINST BARRIERS

BACKGROUND

As technology has advanced, the amount of information that computing devices can store has increased. One problem users can encounter when having such large amounts of information available is being unable to quickly and easily navigate through the information in order to find particular information that they want. This can lead to user frustration and dissatisfaction with the computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first set of entries at a beginning of a list having multiple entries is displayed. Different ones of the multiple entries are displayed as the list is scrolled through in response to a first user gesture. Additionally, in response to the first user gesture when a second set of entries at an end of the list is being displayed, the second set of entries is displayed in a manner in which the second set of entries appear to react against a barrier at the end of the list. Furthermore, in response to a second user gesture when the second set of entries is being displayed, the first set of entries at the beginning of the list is displayed.

In accordance with one or more aspects, a first set of entries in a list having multiple entries is displayed. In response to a request to scroll through the list, a determination is made as to whether a second set of entries at the end of the list is being displayed as the first set of entries. The list is scrolled in a requested direction to display additional entries of the multiple entries if the second set of entries at the end of the list is not being displayed as the first set of entries. However, the second set of entries is displayed as reacting against a barrier at the end of the list if the second set of entries at the end of the list is being displayed as the first set of entries. Furthermore, in response to a request to jump to the beginning of the list, a third set of entries at the beginning of the list is displayed.

BRIEF DESCRIPTION OF THE DRAWINGS

The same numbers are used throughout the drawings to reference like features.

DETAILED DESCRIPTION

Displaying lists as reacting against barriers is discussed herein. A list having multiple entries is displayed to the user. The user can scroll through the list from the beginning of the list to the end of the list using a particular gesture (e.g., dragging his or her finger a small distance on a touch input panel). At the end of the list, in response to that particular gesture, the list is displayed as if it were reacting against (e.g., bouncing or compressing against) a barrier at the end of the list. However, at the end of the list if the user inputs a different gesture (e.g., dragging his or her finger a longer distance on the touch input panel), then the list is displayed again from the beginning of the list.

Additionally, a list can be separated into multiple different portions. The user can scroll through the list from the beginning of a portion to the end of the portion using a particular gesture (e.g., dragging his or her finger a small distance on a touch input panel). At the end of the portion, in response to that particular gesture, the list is displayed as if it were reacting against a barrier at the end of the portion. However, at the end of the portion if the user inputs a different gesture (e.g., dragging his or her finger a longer distance on the touch input panel), then the list is displayed from either the beginning of the next portion (if there is a next portion in the list) or is displayed again from the beginning of the list (if there is no next portion in the list).

Figure 1:
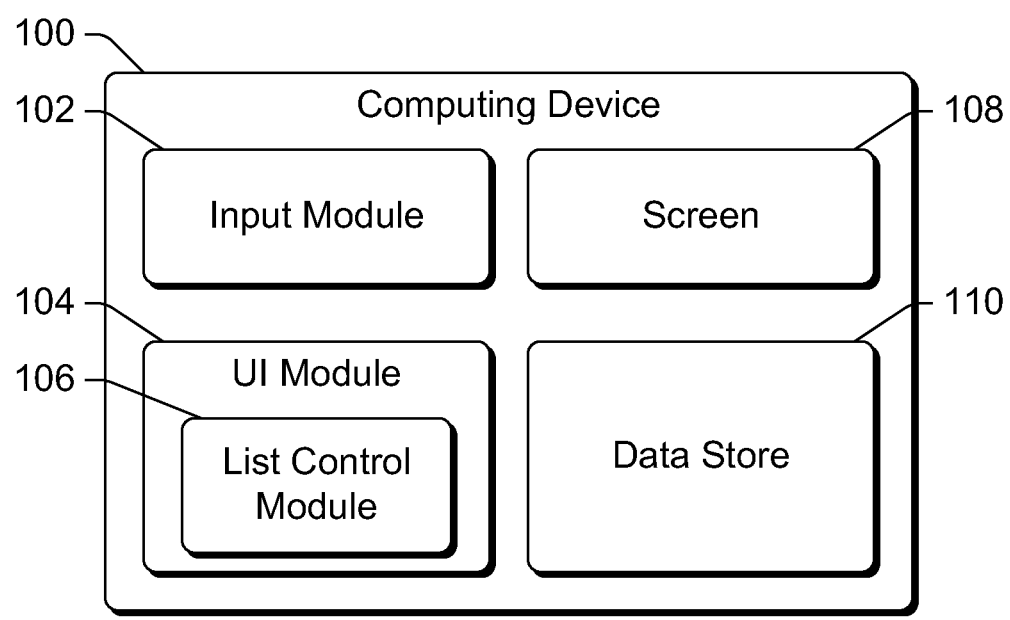
FIG. 1 illustrates an example computing device implementing the displaying lists as reacting against barriers in accordance with one or more embodiments.

FIG. 1 illustrates an example computing device 100 implementing the displaying lists as reacting against barriers in accordance with one or more embodiments. Computing device 100 can be a variety of different types of devices, such as a handheld computer, a cellular phone, a satellite phone, other types of wireless phones, a laptop computer, a personal digital assistant (PDA), an audio and/or video playback device, a portable game device, an automotive computer, a dedicated messaging device, a netbook, a tablet computer, and so forth. Thus, computing device 100 can range from a full resource device with substantial memory and processor resources (e.g., personal computers, game consoles) to a low-resource device with limited memory and/or processing resources (e.g., traditional set-top boxes, hand-held game consoles).

It is to be appreciated that computing device 100 can include various functionality implemented in software, firmware, and/or hardware. For example, computing device 100 can include calendar functionality, audio and/or video playback functionality, word processing functionality, Internet browsing functionality, and so forth. Computing device 100 can also include functionality to communicate with a variety of different servers or other devices via a variety of different networks, including the Internet, a local area network (LAN), a public telephone network, a cellular phone network, a satellite phone network, an intranet, other public and/or proprietary networks, combinations thereof, and so forth. Computing device 100 can also include functionality to support incoming and/or outgoing voice calls, messages that comply with the Short Message Service (SMS) communication protocol, messages that comply with the Multimedia Messaging Service (MMS) communication protocol, and so forth.

Computing device 100 includes an input module 102, a user interface (UI) module 104 including a list control module 106, and a screen 108. Each of modules 102, 104, and 106 can be implemented in software, firmware, hardware, or combinations thereof. When implemented in software or firmware, a module includes one or more instructions that are executed by one or more processors or controllers of computing device 100.

Screen 108 is a display component of computing device 100. Screen 108 can be implemented in a variety of different manners, such as using liquid crystal display (LCD) technology, plasma screen technology, image projection technology, and so forth. Alternatively, rather than including screen 108, computing device 100 can generate one or more signals that are output to other display devices that include screen 108.

Input module 102 receives user inputs from a user of computing device 100. User inputs can be provided in a variety of different manners, such as by pressing one or more keys of a keypad or keyboard of device 100, or pressing a particular portion of a touch input panel or touchscreen of device 100. Touchscreen or touch input panel functionality can be provided using a variety of different technologies, such as through capacitive, surface acoustic wave, resistive, optical, strain gauge, dispersive signals, acoustic pulse, or other technologies. The user input can also be provided in other manners, such as via audible inputs, other physical feedback input to the device (e.g., tapping any portion of device 100 or another action that can be recognized by a motion detection component of device 100, such as shaking device 100, rotating device 100, etc.), and so forth.

UI module 104 generates, manages, and/or outputs a user interface for presentation by device 100. This presentation can include a display on screen 108, playing back audio content (e.g., a ringtone or song), physically moving device 100 (e.g., vibrating), and so forth. The user interface presents various information, and user inputs can be received by input module 102 as discussed above.

One manner in which UI module 104 can present information to a user of device 100 is via a list. A variety of different information can be displayed via a list, such as songs, images, video clips, documents, applications or programs that can be purchased or run on device 100, links to web sites, and so forth. In one or more embodiments, device 100 includes data store 110 in which various data is stored (e.g., songs, images, video clips, web site Uniform Resource Locators (URLs), etc.) that can be displayed via a list. Alternatively, the data can be stored elsewhere, such as on a remote device, in a registration store (e.g., operations system registry) of computing device 100, and so forth.

UI module 104 includes a list control module 106. List control module 106 manages the display of a list as if it were reacting against a barrier, and the display of the list jumping to the beginning or end of the list (or to a next portion of the list) as discussed in more detail below. It should be noted that in certain situations the list is displayed as if a set of entries in the list were reacting against a barrier, although no barrier is displayed. Alternatively, such a barrier can be displayed by list control module 106. The set of entries can be displayed as if it were reacting against a barrier in a variety of different manners, such as displaying the second set of entries as if it were bouncing against the barrier, displaying the second set of entries as if it were compressing against the barrier, and so forth.

A list having multiple entries is displayed by list control module 106 on screen 108. The number of entries in the list is oftentimes larger than can be displayed on screen 108 at a single time, so a first set of the entries (the beginning of the list) is displayed by list control module 106 on screen 108. The user can scroll through this list by inputting scroll requests via input module 102, and different ones of the multiple entries are displayed as the list is scrolled through. Using this scrolling, the user can scroll forwards through the list (e.g., towards the bottom or end of the list) or backwards through the list (e.g., towards the top or beginning of the list). When scrolling forwards through the list and the end of the list is displayed, the user can continue to input forward scroll requests via input module 102. However, because the end of the list is being displayed and there are no further entries in the list to display to the user, an indication of the end of the list is presented to the user in response to a request to scroll further forward in the list. This indication is displaying a second set of entries (the entries at the end of the list) as if it were reacting against a barrier at the end of the list.

Additionally, rather than a scroll request, the user can input a jump request to have the list jump or snap back to the beginning In response to this jump request list control module 106 displays the first set of entries (the beginning of the list) on screen 108. Thus, rather than scrolling backwards through the list, the user can request to quickly jump back to the beginning of the list.

List control module 106 operates in a similar manner when the user scrolls backwards through the list. When scrolling backwards through the list and the beginning of the list is displayed, the user can continue to input backward scroll requests via input module 102. However, because the beginning of the list is being displayed and there are no further entries in the list to display to the user, an indication of the beginning of the list is presented to the user in response to a request to scroll further backward in the list. This indication is displaying the first set of entries (the entries at the beginning of the list) as if it were reacting against a barrier at the beginning of the list.

Furthermore, rather than a scroll request, the user can input a jump request to have the list display jump or snap back to the ending. In response to this jump request list control module 106 displays the second set of entries (the end of the list) on screen 108. Thus, rather than scrolling forwards through the list, the user can request to quickly jump to the end of the list.

Additionally, in one or more embodiments a list is separated into multiple different portions or sections. The user can scroll through a portion of the list by inputting scroll requests via input module 102, and different ones of the multiple entries in that portion are displayed as the list is scrolled through. As discussed above, the user can scroll forwards through the list or backwards through the list. When the user scrolls forwards and the end of the portion is displayed, the user can continue to input forward scroll requests via input module 102. However, because the end of the portion is being displayed and there are no further entries in the portion to display to the user, an indication of the end of the portion is presented to the user in response to a request to scroll further forward in the list. This indication is displaying the set of entries at the end of the portion as if they were reacting against a barrier at the end of the portion.

However, rather than a forward scroll request, when the set of entries at the end of the portion is displayed the user can input a jump request to have the list jump or snap back. The set of entries in the list displayed by list control module 106 in response to the jump request depends on whether there is another portion beyond the current portion. If there is another portion beyond the current portion, then in response to this jump request list control module 106 displays a set of entries that are the entries at the beginning of the next portion of the list succeeding the current portion (e.g., the next portion towards the end of the list). However, if there is not another portion beyond the current portion (the end of the portion is also the end of the list), then in response to this jump request list control module 106 displays the first set of entries (the beginning of the list) on screen 108.

List control module 106 operates in a similar manner when the user scrolls backwards through the list. When the user scrolls backwards and the beginning of the portion is displayed, the user can continue to input backwards scroll requests via input module 102. However, because the beginning of the portion is being displayed and there are no further entries in the portion to display to the user, an indication of the beginning of the portion is presented to the user in response to a request to scroll backwards in the list. This indication is displaying the set of entries at the beginning of the portion as if they were reacting against a barrier at the beginning of the portion.

However, rather than a backward scroll request, when the set of entries at the beginning of the portion is displayed the user can input a jump request to have the list jump or snap back. The set of entries in the list displayed by list control module 106 in response to the jump request depends on whether there is another portion beyond the current portion. If there is another portion beyond the current portion, then in response to this jump request list control module 106 displays a set of entries that are the entries at the ending of the next portion of the list preceding the current portion (e.g., the next portion towards the beginning of the list). However, if there is not another portion beyond the current portion (the beginning of the portion is also the beginning of the list), then in response to this jump request list control module 106 displays the second set of entries (the ending of the list) on screen 108.

FIGS. 2, 3, 4, 5, and 6 illustrate example screen displays in accordance with one or more embodiments of the displaying lists as reacting against barriers. In each of FIGS. 2-6, a screen 200 of a computing device is displayed. Screen 200 can be, for example, screen 108 of FIG. 1. A UI module (such as module 104 of FIG. 1) manages the display on screen 108, and displays a header area 202 and a data display area 204. Various data displayed by UI module 104 of FIG. 1 are displayed in data display area 204, such as lists, other images generated by applications running on the computing device, and so forth. Information describing the operation of the computing device is displayed in header area 202. For example, header area 202 can include a name of an application having an interface displayed in area 204 (e.g., "Music Player") and a current time ("3:48 PM"). It is to be appreciated, however, that different and/or additional information can be displayed in header area 202, such as one or more vertical bars indicating the strength of a wireless signal being received by a computing device, an amount of charge remaining in a battery of a computing device, and so forth.

In each of FIGS. 2-6, entries from a list of song titles are displayed in area 204. It is to be appreciated that song titles are an example of a list, and that other information can be displayed in a list as discussed above. Additionally, in FIGS. 2-6 the list is displayed vertically. It is to be appreciated that the list can alternatively be displayed in other orientations, such as horizontally. Also, in FIGS. 2-6 the reacting against a barrier is discussed as bouncing against a barrier. It is to be appreciated, however, that a set of entries can be displayed as reacting against a barrier in other manners as discussed above.

The user can perform a variety of different actions with the song titles in the list, such as select songs for playback, select songs for copying to another device, select songs for deletion, select songs for purchase, and so forth. The user can also scroll through the list of songs, causing the entries in the list that are displayed to change. A variety of different user inputs can be used to scroll through the list of songs. In the illustrated example, a first user gesture is used as a forward scroll request. This first user gesture is the user touching a portion of the touch input panel (which is a touchscreen overlaying screen 200) and dragging his or her finger towards the top of the touch input panel. In one or more embodiments the user can input the first user gesture at any location on the touch input panel, although in alternate embodiments the first user gesture is to be input at a particular one or more locations on the touch input panel.

Figure 2:
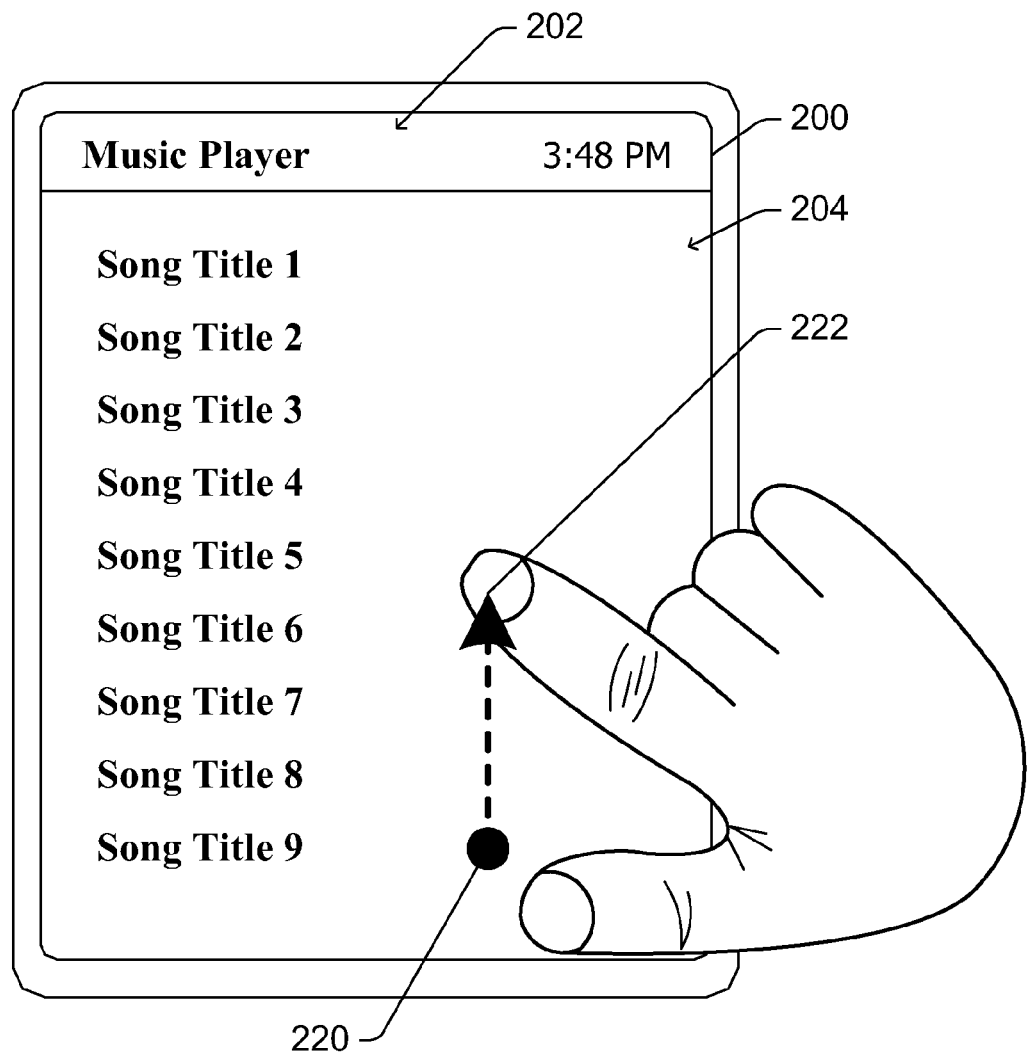
FIGS. 2, 3, 4, 5, 6, and 7 illustrate example screen displays in accordance with one or more embodiments of the displaying lists as reacting against barriers.

FIG. 2 illustrates an example screen display in which a set of entries at the beginning of the list of song titles is displayed in area 204. These song titles are listed as "Song Title 1", "Song Title 2", . . . , "Song Title 9". Additionally, a first user gesture is illustrated by a finger touching the touch input panel at point 220 and being dragged to point 222 (where the user stops moving his or her finger, lifts his or her finger, etc.). In response to this first user gesture, a list control module (such as module 106 of FIG. 1) displays different entries in the list. This first user gesture can be input multiple times, resulting in different entries in the list being displayed as the user scrolls towards the end of the list. Alternatively, in response to the first user gesture the list can begin scrolling and not stop until a further input is received from the user (e.g., scrolling begins when the user stops moving his or her finger, and scrolling stops when the user lifts his or her finger from the touch input panel).

Figure 3:
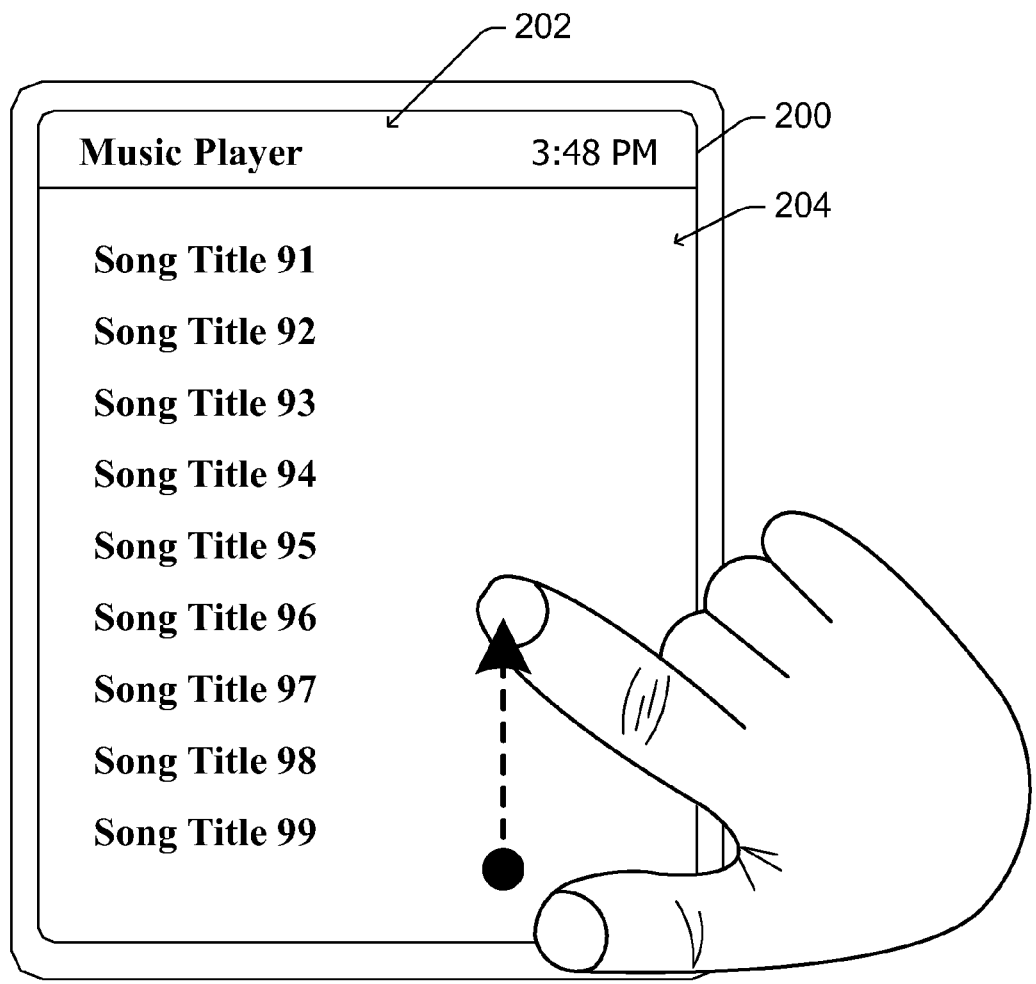

FIG. 3 illustrates an example screen display in which a set of entries at the end of the list of song titles is displayed in area 204. These song titles are listed as "Song Title 91", "Song Title 92", . . . , "Song Title 99". The end of the list of song titles is displayed, for example, after the user has scrolled through the list of song titles by repeatedly entering the first user gesture.

Additionally, in FIG. 3 the first user gesture to scroll forward in the list of song titles is also illustrated as being input. Because the end of the list of song titles is already being displayed, there are no further song titles in the list that can be displayed. Accordingly, the list control module indicates that the end of the list has been reached by displaying the set of entries at the end of the list as if they were bouncing off a barrier at the end of the list (after "Song Title 99").

Figure 4:
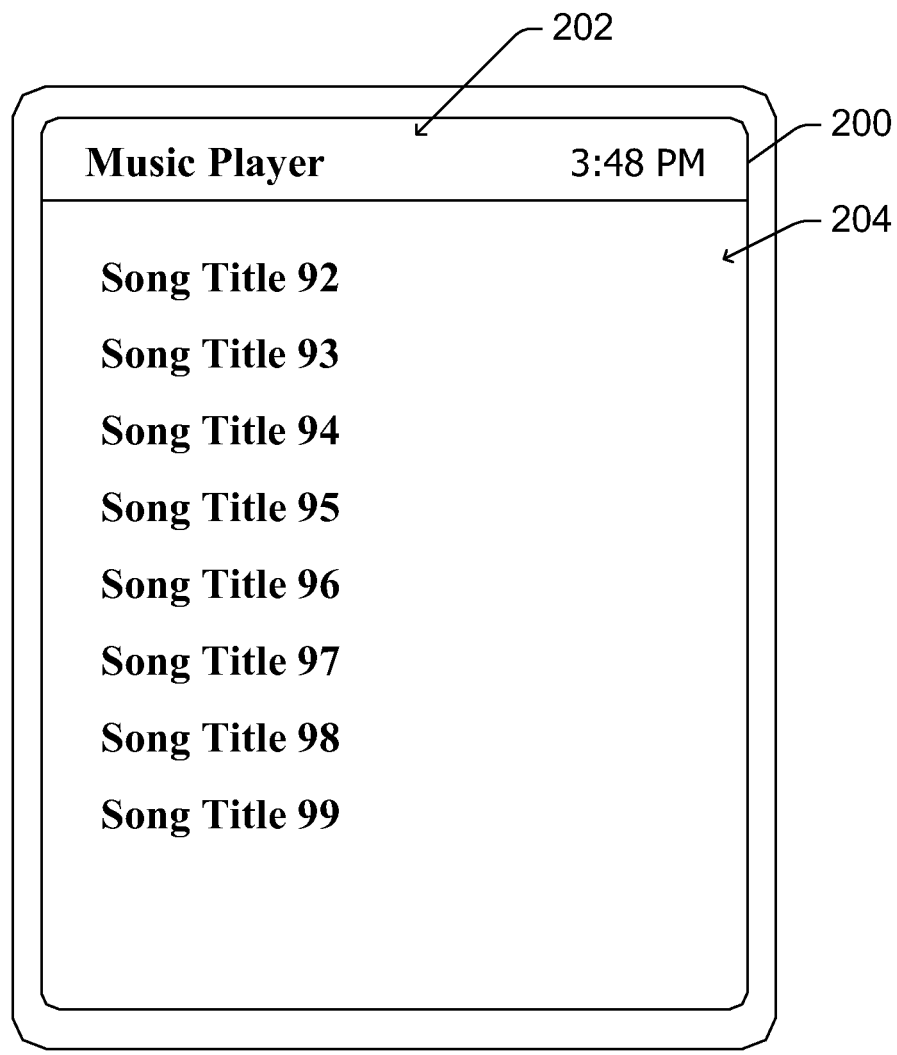

FIG. 4 illustrates an example screen display in which the set of entries at the end of the list of song titles is displayed in area 204 as having bounced against a barrier at the end of the list. As can be seen in FIG. 4 relative to FIG. 3, the "Song Title 91" is no longer displayed, and the remaining song titles are displayed closer to the top of area 204 (e.g., closer to area 202) than in FIG. 3. This gives the appearance of the set of entries at the end of the list having bounced up against a barrier at the end of the list. After bouncing up to the display illustrated in FIG. 4, the input control module returns to displaying the end of the list of songs as illustrated in FIG. 3.

Two example screen displays are illustrated in FIGS. 3 and 4, and FIG. 3 can be viewed as the low point of the bounce and FIG. 4 can be viewed as the high point of the bounce. It is to be appreciated that the set of song titles can be displayed at numerous additional locations between this low point of the bounce and this high point of the bounce in order to give the appearance of motion to the user. Additionally, it is to be appreciated that the appearance of bouncing can include displaying the bounce at its high point a single time, multiple times, or with a gradually decreasing high point.

Figure 5:
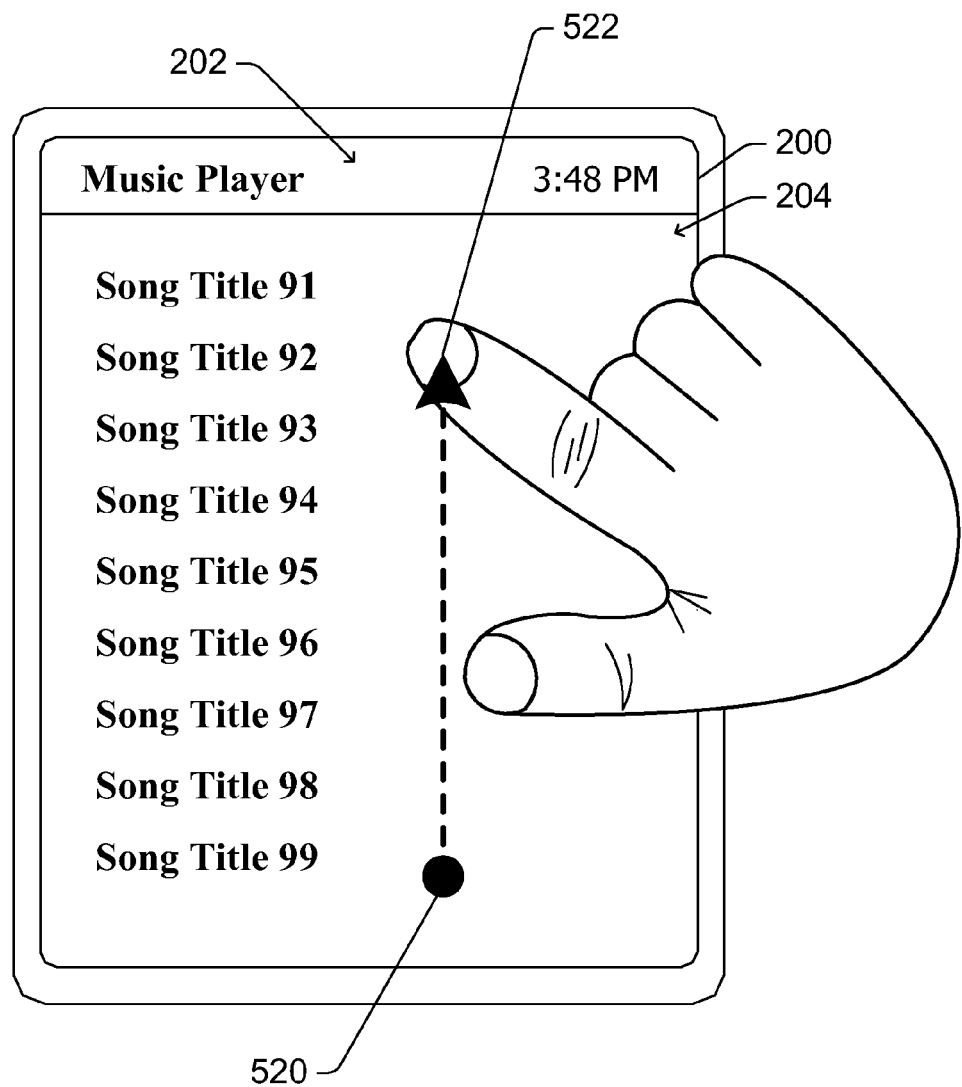

FIG. 5 illustrates an example screen display in which a set of entries at the end of the list of song titles is displayed in area 204, analogous to FIG. 3. However, in FIG. 3 a second user gesture is input. This second user gesture is the user touching a portion of the touch input panel and dragging his or her finger towards the top of the touch input panel. The second user gesture is similar to the first user gesture, but differs in that the user drags his or her finger a greater distance for the second user gesture than for the first user gesture. Similar to the first user gesture, in one or more embodiments the user can input the second user gesture at any location on the touch input panel, although in alternate embodiments the second user gesture is to be input at a particular one or more locations on the touch input panel.

The second user gesture is illustrated by a finger touching the touch input panel at point 520 and being dragged to point 522. In response to this second user gesture, the list control module jumps or snaps back to the beginning of the list. Accordingly, a set of entries at the beginning of the list are displayed as in FIG. 2. It should be noted that in response to the second user gesture, the list control module can display the list as if it bounces against a barrier at the beginning of the list (before "Song Title 1").

In FIGS. 2-6, the list control module distinguishes between the first user gesture and the second user gesture based on the duration of the drag. The duration of the drag begins when the user touches the screen (e.g., at point 220 of FIG. 2), and ends when the user stops dragging his or her finger (e.g., at point 222 of FIG. 2). When the user touches the touch input panel and drags his or her finger, the duration of the drag is determined. If the duration of the drag is less than a threshold distance, then the list control module determines that the input is the first user gesture. However, if the duration of the drag is at least the threshold distance, then the list control module determines that the input is the second user gesture. Alternatively, the duration can be time-based rather than distance-based. For example, if the duration of the drag is less than a threshold amount of time (e.g., number of seconds), then the list control module determines that the input is the first user gesture. However, if the duration of the drag is at least the threshold amount of time, then the list control module determines that the input is the second user gesture. Alternatively, the duration can be a combination of time-based and distance-based.

In one or more embodiments, the list control module is programmed or otherwise configured with the threshold distance and/or time. This threshold distance and/or time can optionally be set and/or changed in response to a user request to set and/or change the threshold distance. Such a user request can be received, for example, via input module 102 of FIG. 1.

Figure 6:
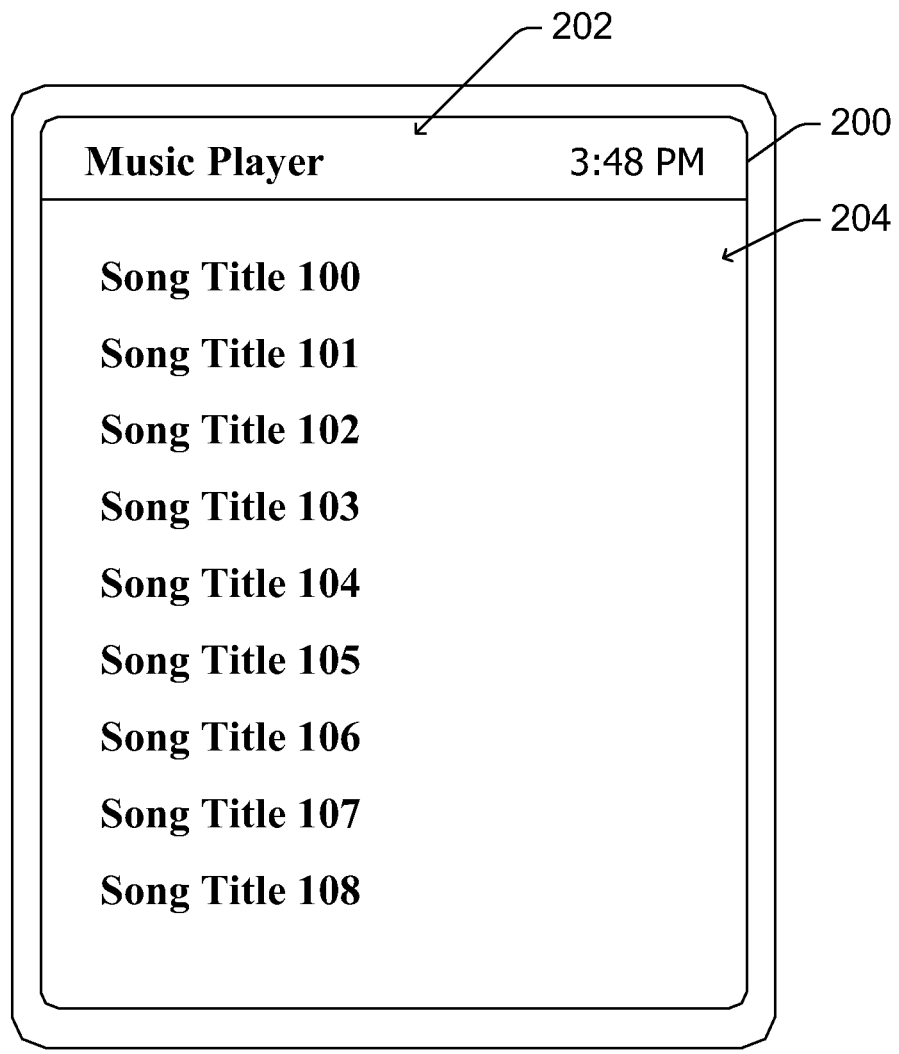

Jumping to the beginning of the list in response to the second user gesture assumes that the end of the list is being displayed in FIG. 5. However, if FIG. 5 illustrates an example screen display in which a set of entries at the end of a portion of the list of songs (but not the end of the list of songs) is displayed, then in response to the second user gesture a set of entries at the beginning of the next portion of the list is displayed. FIG. 6 illustrates an example screen display in which a set of entries at the beginning of a portion of the list of song titles is displayed in area 204. The example screen display in FIG. 6 is similar to the example screen display in FIG. 2, except that the beginning of the portion in FIG. 6 is not the beginning of the list. The user can scroll through the portion beginning with the example screen display in FIG. 6 analogous to the discussions above.

The example screen displays in FIGS. 2-6 illustrate an example of scrolling from the beginning of the list to the end of the list, bouncing off the end of the list in response to a first user gesture, and jumping back to the beginning of the list (or jumping to the next portion) in response to a second user gesture. It is to be appreciated that the displaying lists as reacting against barriers techniques discussed herein works analogously when scrolling backwards through the list. For example, the user can scroll from the end of the list to the beginning of the list, bounce against the beginning of the list in response to one user gesture, and jump to the end of the list (or jump to the next portion) in response to a different user gesture. It is to be appreciated that the user gestures when scrolling backwards are different than the user gestures when scrolling forwards. For example, the user gestures when scrolling backwards can be the user touching a portion of the touch input panel and dragging his or her finger towards the bottom of the touch input panel rather than towards the top of the touch input panel.

FIGS. 2-6 are discussed with reference to particular user gestures. It is to be appreciated, however, that these user gestures are examples and that a variety of different user gestures can be used with the displaying lists as reacting against barriers. These different gestures can be based on a variety of different actions, gestures, etc. that can be input via an input module (e.g., input module 102 of FIG. 1). For example, rather than touching a touch input panel with a finger, the touch input panel can be touched with a stylus or other object. By way of another example, rather than touching the touch input panel, the user may place his or her finger or stylus close to (but not in physical contact with) an input component. By way of yet another example, the user may shake or rotate the device in a particular manner rather than inputting requests via a touch input panel.

Additionally, it should be noted that although the second user gesture (resulting in jumping to the beginning or end of the list, or to another portion) is discussed above as being input by a user at the beginning or end of the list (or a portion), in one or more embodiments the second user gesture can be input by the user when other entries of the list are displayed. Regardless of which entries are being displayed when the second user gesture is input, in response to the second user gesture the list control module jumps back to the beginning (or ending) of the list, or alternatively to the next portion of the list.

Figure 7:
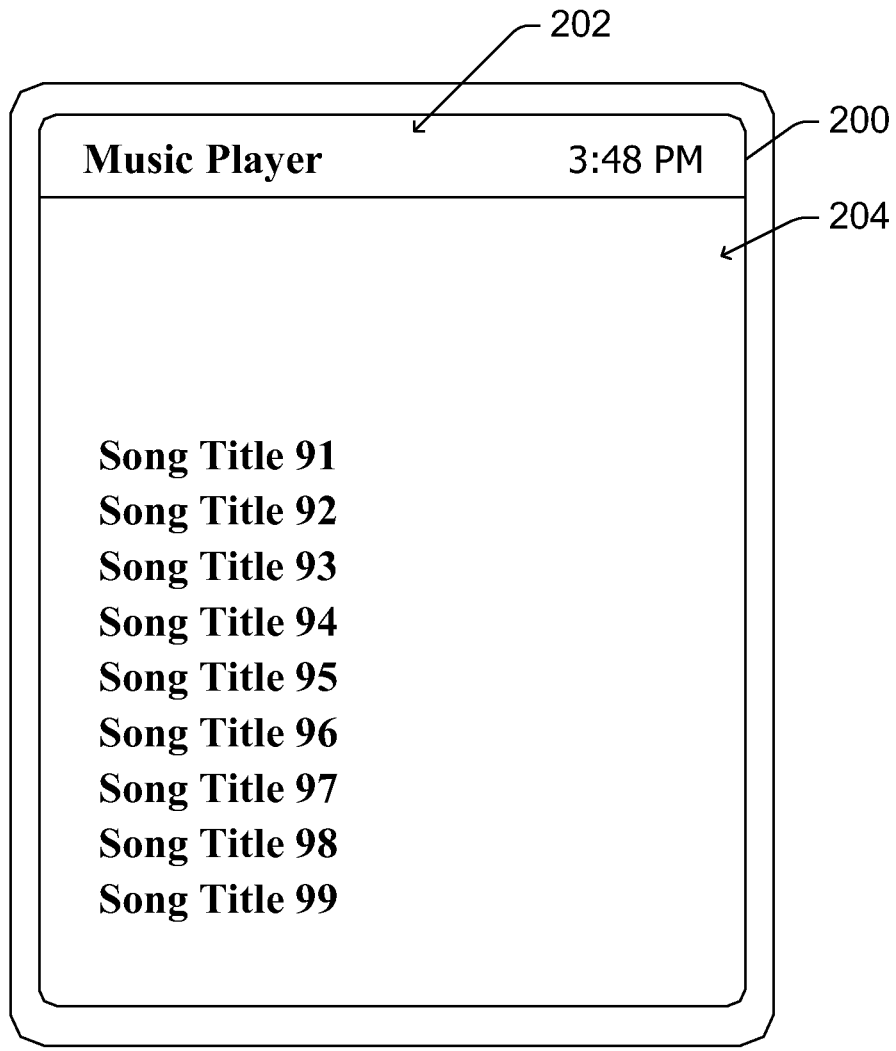

Alternatively, rather than bouncing against a barrier, a list can be displayed as reacting against a barrier in other manners. For example, a list can be displayed as compressing against a barrier. When displayed as compressing against a barrier, the set of entries are displayed in a more compressed manner. FIG. 7 illustrates an example screen display similar to that in FIGS. 2-6, but in which the set of entries at the end of the list of song titles is displayed in area 204 as having compressed against a barrier at the end of the list. As can be seen in FIG. 7 relative to FIG. 3, the same song titles are displayed, but are displayed in a more compressed manner against the bottom of area 204 than in FIG. 3. This gives the appearance of the set of entries at the end of the list as having encountered a barrier and compressing against (e.g., piling up or pushing up against) the barrier. After compressing the entries to the display illustrated in FIG. 7, the input control module returns to displaying the end of the list of songs in the normal manner as illustrated in FIG. 3.

It should be noted that in the example of FIG. 7, the song titles displayed as compressing against the barrier are the same song titles as were displayed prior to compressing against the barrier (in FIG. 3). Alternatively, additional song titles can be displayed when the song titles are displayed as compressing against the barrier due to there being additional space in area 204 in which the song titles can be displayed (as a result of the compressing).

Figure 8:
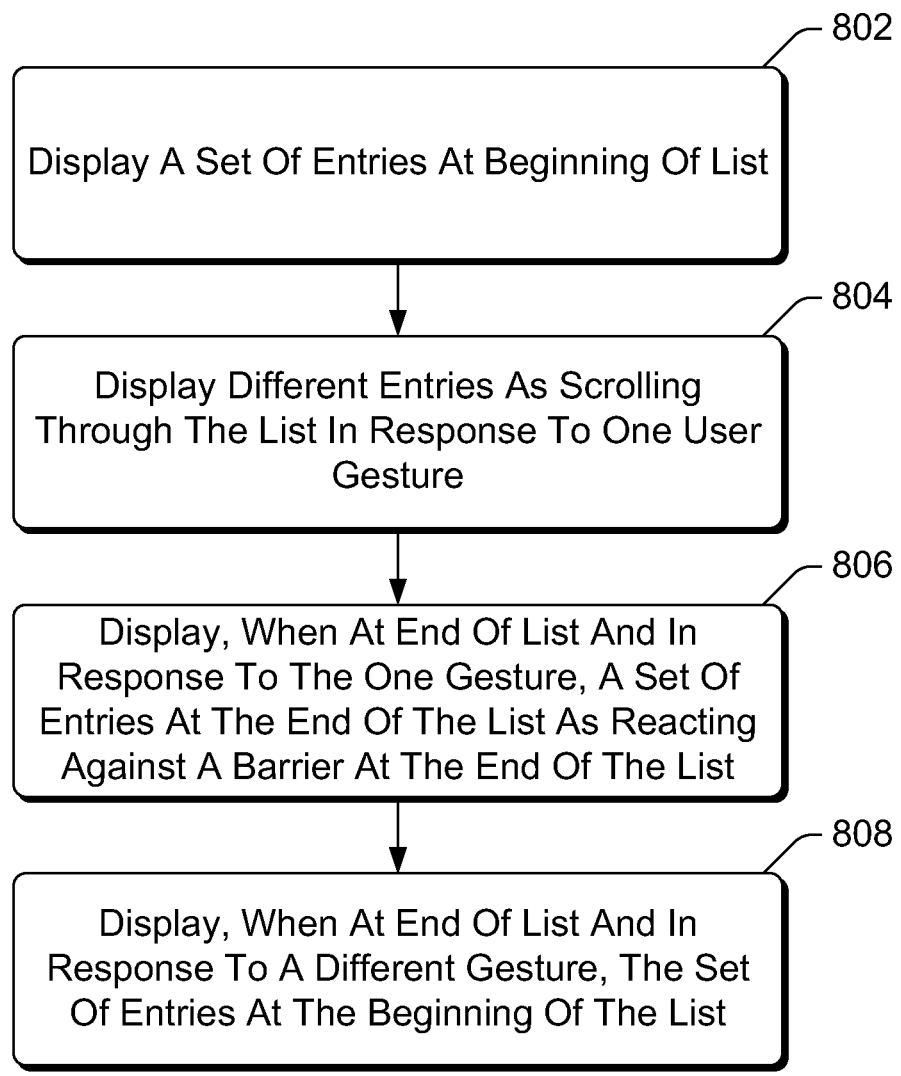
FIG. 8 is a flowchart illustrating an example process for displaying lists as reacting against barriers in accordance with one or more embodiments.

FIG. 8 is a flowchart illustrating an example process 800 for displaying lists as reacting against barriers in accordance with one or more embodiments. Process 800 is carried out by a device, such as computing device 100 of FIG. 1, and can be implemented in software, firmware, hardware, or combinations thereof. Process 800 is shown as a set of acts and is not limited to the order shown for performing the operations of the various acts. Process 800 is an example process for displaying lists as reacting against barriers; additional discussions of displaying lists as reacting against barriers are included herein with reference to different figures.

In process 800, a set of entries at the beginning of a list are displayed (act 802). The list includes multiple entries and can have a variety of different information as discussed above.

Different entries in the list are displayed as the list is scrolled through in response to a particular user gesture (act 804). A variety of different user gestures can be used to indicate to scroll through the list as discussed above.

In response to both the end of the list being displayed and the particular user gesture being received, a set of entries at the end of the list is displayed in a manner in which the set of entries appear to react against a barrier at the end of the list (act 806). This reacting is discussed in additional detail above.

However, in response to both the end of the list being displayed and a different user gesture being received, the set of entries at the beginning of the list are displayed (act 808). In act 808 the display of the list jumps back to the beginning of the list as discussed above. A variety of different user gestures can be used to indicate to jump to the beginning of the list as discussed above.

Figure 9:
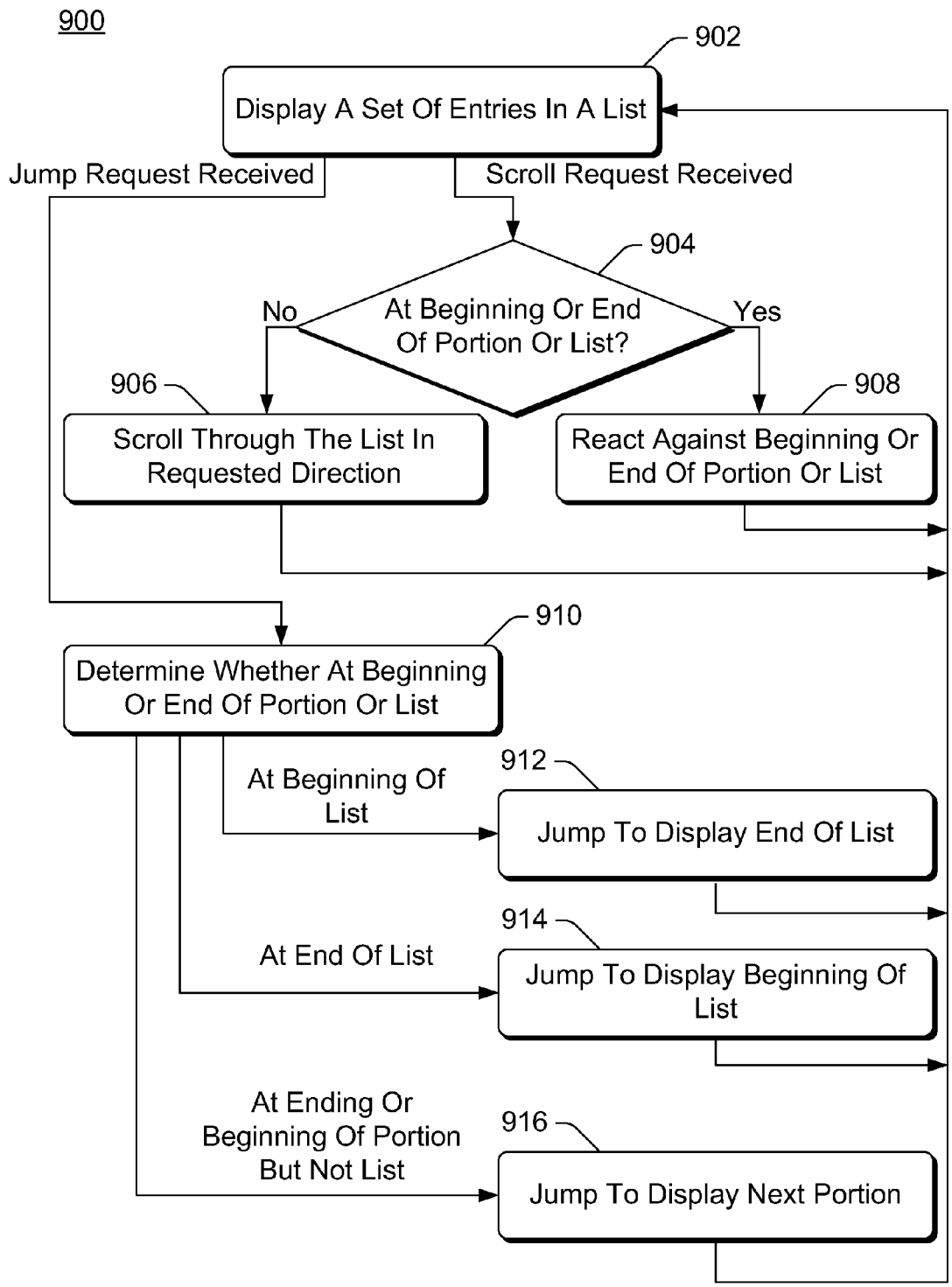
FIG. 9 is a flowchart illustrating another example process for displaying lists as reacting against barriers in accordance with one or more embodiments.

FIG. 9 is a flowchart illustrating an example process 900 for displaying lists as reacting against barriers in accordance with one or more embodiments. Process 900 is carried out by a device, such as computing device 100 of FIG. 1, and can be implemented in software, firmware, hardware, or combinations thereof. Process 900 is shown as a set of acts and is not limited to the order shown for performing the operations of the various acts. Process 900 is an example process for displaying lists as reacting against barriers; additional discussions of displaying lists as reacting against barriers are included herein with reference to different figures.

In process 900, a set of entries in a list are displayed (act 902). The list includes multiple entries and can have a variety of different information as discussed above.

Process 900 proceeds based on whether a jump request is received or a scroll request is received. As discussed above, an example of a scroll request is a first user gesture of the user touching and dragging his or her finger for less than a threshold distance, while an example of a jump request is a second user gesture of the user touching and dragging his or her finger for at least the threshold distance.

If a scroll request is received, then a determination is made as to whether the set of entries are at the beginning or end of a portion or list (act 904). If the set of entries are not at the beginning or end of a portion or list, then the list is scrolled through in the requested direction (act 906). This requested direction can be forwards or backwards as discussed above. A new set of entries is then displayed (act 902) as a result of the scrolling.

However, if the set of entries are at the beginning or end of a portion or list, then the set of entries is displayed as reacting against a barrier at the beginning or end of the portion or list (act 908). Process 900 returns to act 902, where the set of entries is displayed after the reacting against the barrier.

Returning to act 902, if a jump request is received then a determination is made as to whether the set of entries being displayed are at the beginning of the list, at the end of the list, or at a beginning or end of a portion of the list (act 910). If the set of entries is at the beginning of the list, then process 900 jumps to display a set of entries at the end of the list (act 912), and returns to act 902 where the set of entries displayed is the set of entries at the end of the list. However, if the set of entries is at the end of the list, then process 900 jumps to display a set of entries at the beginning of the list (act 914), and returns to act 902 where the set of entries displayed is the set of entries at the beginning of the list. On the other hand, if the set of entries is at the beginning or end of a portion but not at the beginning or end of the list, then process 900 jumps to display a set of entries in the next portion of the list (act 914), and returns to act 902 where the set of entries displayed is the set of entries in the next portion of the list. This next portion can be a portion closer to the end of the list (if the set of entries being displayed was at the end of the portion) or a portion closer to the beginning of the list (if the set of entries being displayed was at the beginning of the list).

In acts 910-916 it is assumed that the jump request is received when the set of entries being displayed is at the beginning or end of a list or portion. If the jump request is received when the set of entries being displayed is not at the beginning of a list or portion, or at the end of a list or portion, then a variety of different acts can be performed (optionally dependent on a particular gesture used to input the jump request). For example, process 900 can jump to display a set of entries at the end of the list, can jump to display a set of entries at the beginning of the list, or can jump to display a set of entries in the next portion of the list. Alternatively, process 900 can ignore the jump request, and return to act 902 to continue displaying the set of entries without jumping to a different location in the list.

Figure 10:
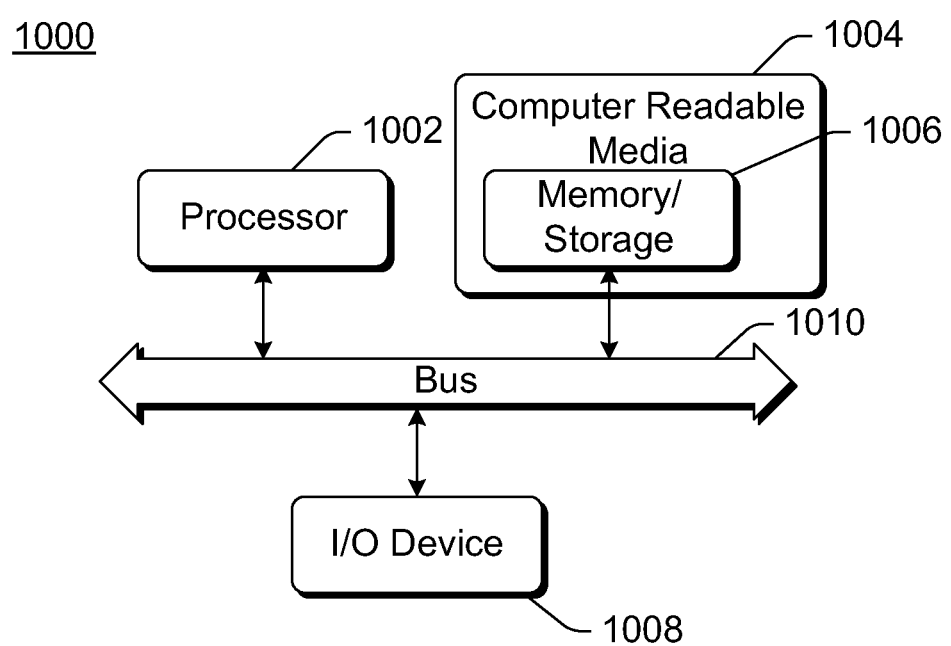
FIG. 10 illustrates an example computing device that can be configured to implement the displaying lists as reacting against barriers in accordance with one or more embodiments.

FIG. 10 illustrates an example computing device 1000 that can be configured to implement the displaying lists as reacting against barriers in accordance with one or more embodiments. Computing device 1000 can be, for example, computing device 100 of FIG. 1.

Computing device 1000 includes one or more processors or processing units 1002, one or more computer readable media 1004 that can include one or more memory and/or storage components 1006, one or more input/output (I/O) devices 1008, and a bus 1010 that allows the various components and devices to communicate with one another. Computer readable media 1004 and/or one or more I/O devices 1008 can be included as part of, or alternatively may be coupled to, computing device 1000. Bus 1010 represents one or more of several types of bus structures, including a memory bus or memory controller, a peripheral bus, an accelerated graphics port, a processor or local bus, and so forth using a variety of different bus architectures. Bus 1010 can include wired and/or wireless buses.

Memory/storage component 1006 represents one or more computer storage media. Component 1006 can include volatile media (such as random access memory (RAM)) and/or nonvolatile media (such as read only memory (ROM), Flash memory, optical disks, magnetic disks, and so forth). Component 1006 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1002. It is to be appreciated that different instructions can be stored in different components of computing device 1000, such as in a processing unit 1002, in various cache memories of a processing unit 1002, in other cache memories of device 1000 (not shown), on other computer readable media, and so forth. Additionally, it is to be appreciated that the location where instructions are stored in computing device 1000 can change over time.

One or more input/output devices 1008 allow a user to enter commands and information to computing device 1000, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 10. The features of the displaying lists as reacting against barriers techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    displaying a first set of entries at a beginning of a list, the list having multiple entries, at least some of the entries of the list not being displayed as the first set of entries;
    displaying different ones of the multiple entries as the list is scrolled through in response to a first user gesture;
    displaying, in response to the first user gesture when a second set of entries at an end of the list is being displayed, the second set of entries in a manner in which the second set of entries appear to react against a barrier at the end of the list, reaction against the barrier at the end of the list comprising displaying the entries at the end of the list and displaying the entries at additional locations relative to the barrier to give the appearance of motion to the user; and
    displaying, in response to a second user gesture when the second set of entries is being displayed, the first set of entries at the beginning of the list, the first set of entries having not been displayed when the second user gesture is made, wherein the second user gesture being configured to cause display of the first set of entries without requiring the user to execute multiple scrolls.

2. A method as recited in claim 1, wherein the first user gesture comprises dragging a finger less than a threshold distance on a touch input panel, and wherein the second user gesture comprises dragging a finger at least the threshold distance on the touch input panel.

3. A method as recited in claim 1, wherein displaying the second set of entries in a manner in which the second set of entries appear to react against a barrier at the end of the list comprises displaying the second set of entries in a manner in which the second set of entries appear to bounce against a barrier at the end of the list.

4. A method as recited in claim 1, wherein displaying the second set of entries in a manner in which the second set of entries appear to react against a barrier at the end of the list comprises displaying the second set of entries in a manner in which the second set of entries appear to compress against a barrier at the end of the list.

5. A method as recited in claim 1, wherein the list is separated into multiple portions, the method further comprising:
    displaying, in response to the first user gesture when a third set of entries at the end of a first portion of the multiple portions is being displayed, the third set of entries in a manner in which the third set of entries appear to react against a barrier at the end of the first portion; and
    displaying, in response to the second user gesture when the third set of entries at the end of the first portion is being displayed, a fourth set of entries at the beginning of a second portion of the multiple portions.

6. A method as recited in claim 5, the method further comprising:
    displaying, in response to a third user gesture when a fifth set of entries at the beginning of the first portion is being displayed, the fifth set of entries in a manner in which the fifth set of entries appear to react against a barrier at the beginning of the first portion; and
    displaying, in response to a fourth user gesture when the fifth set of entries at the beginning of the first portion is being displayed, a sixth set of entries at the end of a third portion of the multiple portions.

7. A method as recited in claim 6, wherein the third portion precedes the first portion in the list, and the first portion precedes the second portion in the list.

8. A method as recited in claim 5, wherein the first user gesture comprises dragging a finger less than a threshold distance on a touch input panel, and wherein the second user gesture comprises dragging a finger at least the threshold distance on the touch input panel.

9. A method as recited in claim 8, further comprising changing the threshold distance in response to a user request to change the threshold distance.

10. A method as recited in claim 1, wherein the list comprises a song list, each of the multiple entries comprises a song, the beginning of the list is a top of the song list, and the end of the list is the bottom of the song list.

11. A method as recited in claim 1, wherein the list is displayed and scrolled through vertically.

12. A method as recited in claim 1, the method further comprising:
displaying, in response to a third user gesture when a third set of entries at a beginning of the list is being displayed, the third set of entries in a manner in which the third set of entries appear to react against a barrier at the beginning of the list; and
displaying, in response to a fourth user gesture when the third set of entries is being displayed, the second set of entries at the end of the list.

13. One or more computer storage media having stored thereon multiple instructions that, when executed by one or more processors of a computing device, cause the one or more processors to:
display a first set of entries in a list, the list having multiple entries wherein at least some of the multiple entries are not displayed as the first set of entries;
determine, in response to a request to scroll through the list, whether a second set of entries at the end of the list is being displayed as the first set of entries;
scroll, in response to the request to scroll through the list, the list in a requested direction to display additional entries of the multiple entries if the second set of entries at the end of the list is not being displayed as the first set of entries;
display, in response to the request to scroll through the list, the second set of entries as reacting against a barrier at the end of the list if the second set of entries at the end of the list is being displayed as the first set of entries and the request is a request to scroll forward through the list, reaction against the barrier at the end of the list comprising displaying the entries at the end of the list and displaying the entries at additional locations relative to the barrier to give the appearance of motion to the user; and
display, in response to a request to jump to the beginning of the list, a third set of entries at the beginning of the list, the third set of entries not having been displayed at the time the request to jump is received; the request to jump to the entries at the beginning of the list being executed through a single user action that generates the request.

14. One or more computer storage media as recited in claim 13, wherein to display the second set of entries as reacting against a barrier at the end of the list is to display the second set of entries as bouncing against a barrier at the end of the list.

15. One or more computer storage media as recited in claim 13, wherein the multiple instructions further cause the one or more processors to:
determine, in response to the request to scroll through the list, whether the third set of entries at the beginning of the list is being displayed as the first set of entries, wherein to scroll the list is to scroll the list in the requested direction if the second set of entries at the end of the list is not being displayed and the third set of entries at the beginning of the list is not being displayed; and
display, in response to the request to scroll through the list, the third set of entries as reacting against a barrier at the beginning of the list if the third set of entries at the beginning of the list is being displayed.

16. One or more computer storage media as recited in claim 13, wherein the request to scroll through the list is a first user gesture of dragging a finger less than a threshold distance on a touch input panel, and wherein the request to jump to the beginning of the list is a second user gesture of dragging a finger at least the threshold distance on the touch input panel.

17. One or more computer storage media as recited in claim 13, wherein the request to scroll through the list is a first user gesture of dragging a finger on a touch input panel for less than a threshold amount of time, and wherein the request to jump to the beginning of the list is a second user gesture of dragging a finger on the touch input panel for at least the threshold amount of time.

18. One or more computer storage media as recited in claim 13, wherein the list comprises a list of programs that can be run by the one or more processors.

19. One or more computer storage media as recited in claim 13, wherein the list comprises a list of images.

20. A method in a computing device, the method comprising:
displaying a first set of entries in a list, the list having multiple entries wherein at least some of the multiple entries are not displayed as the first set of entries;
in response to a request to scroll forward through the list, determining whether the first set of entries are at the end of the list, and
scrolling forward in the list to display additional entries of the multiple entries if the first set of entries are not at the end of the list, and
displaying the first set of entries as bouncing against a barrier at the end of the list if the first set of entries are at the end of the list, the bouncing against the barrier at the end of the list comprising displaying the entries at the end of the list and displaying the entries at additional locations relative to the barrier to give the appearance of motion to the user;
in response to a request to jump in the list, the request to jump being executed through a single user action that generates the request, determining whether the first set of entries are at a beginning of the list, at the end of the list, or at a beginning of a portion of the list or at an end of the portion of the list, and
jumping to display a second set of entries at the end of the list if the first set of entries are at the beginning of the list, the second set of entries having not been displayed at the time the request to jump is received;
jumping to display a third set of entries at the beginning of the list if the first set of entries are at the end of the list, the third set of entries having not been displayed at the time the request to jump is received; and
jumping to display a fourth set of entries in a next portion of the list if the first set of entries are at the beginning or end of the portion but are not at the beginning of the list and are not at the end of the list, the fourth set of entries having not been displayed at the time the request to jump is received.

* * * * *